United States Patent
Lagerberg et al.

(10) Patent No.: US 6,227,771 B1
(45) Date of Patent: May 8, 2001

(54) MEANS FOR MUTUALLY PARALLEL DISPLACEMENT OF TOOL HOLDERS

(75) Inventors: Tomas Lagerberg, Upplands Väsby; Derek Presland, Västerås, both of (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/403,993
(22) PCT Filed: Apr. 24, 1998
(86) PCT No.: PCT/SE98/00760
    § 371 Date: Feb. 1, 2000
    § 102(e) Date: Feb. 1, 2000
(87) PCT Pub. No.: WO98/48965
    PCT Pub. Date: Nov. 5, 1998

(30) Foreign Application Priority Data

Apr. 29, 1997 (SE) .................................... 9701599

(51) Int. Cl.⁷ .................................................. B23B 29/24
(52) U.S. Cl. ................. 407/71; 407/76; 407/87; 407/92
(58) Field of Search ................ 407/71, 70, 73, 407/76, 77, 87, 88, 92, 97

(56) References Cited

U.S. PATENT DOCUMENTS

| | | |
|---|---|---|
| 2,363,160 | 11/1944 | Sundstrom . |
| 2,669,149 * | 2/1954 | Watson et al. ................. 82/161 |
| 2,861,322 | 11/1958 | Benes et al. . |
| 2,877,536 | 3/1959 | Monosmith . |
| 3,602,445 | 8/1971 | Nagao et al. . |
| 3,662,445 | 5/1972 | Whitaker . |
| 3,724,965 | 4/1973 | Green . |
| 4,063,841 | 12/1977 | Niman, Jr. . |

* cited by examiner

Primary Examiner—Henry Tsai
(74) Attorney, Agent, or Firm—Burns, Doane, Swecker & Mathis, L.L.P.

(57) ABSTRACT

A metal-cutting mechanism includes an externally threaded screw and a set of non-rotatable insert holders spaced apart equidistantly along an axis of the screw. There are at least first, second, third, and fourth holders arranged axially in succession. The first holder is axially fixed. The second, third and fourth holders are axially movable relative to the first holder. The screw is rotatable relative to the second, third, and fourth holders and is connected thereto such that in response to each revolution of the screw, the second holder is moved in a first axial direction by a distance x, the third holder is moved in the first axial direction by a distance 2x, and the fourth holder is moved in the first axial direction by a distance 3x, whereby the equidistant spacing between the holders is changed by the distance x.

8 Claims, 4 Drawing Sheets

MEANS FOR MUTUALLY PARALLEL DISPLACEMENT OF TOOL HOLDERS

TECHNICAL FIELD OF THE INVENTION

The present invention relates to a device for parallel displacement of insert holders included in a set of insert holders for metal cutting, especially parting or grooving.

PRIOR ART

In connection with insert holders adapted for inserts that perform parting or grooving it is common that a set of insert holders are arranged side by side, adjacent inserts being clamped in said respective holders and having equidistant relationship relative to each other. Spacers are used to achieve said equidistant relationship, said spacers being applied between the insert holders. This technique will be described more in detail with reference to FIG. 1. Since this handling of spacers is performed manually it is at once realized that such arrangement is time consuming when the distance between adjacent inserts is to be changed, said equidistant relationship however being maintained. This happens quite frequently, e.g. when manufacturing parts for ball bearings. It is also difficult to manage to get said distances exactly the same since the thickness of the spacers may vary. Normally the rearrangement of the spacers is carried out by trial and error until the equidistant relationship, of required tolerance, between adjacent spacers is achieved.

OBJECTS AND FEATURES OF THE INVENTION

An object of the present invention is to present a device of the type defined above where the distance between adjacent inserts is equally large and at a high tolerance level. When the distance between adjacent inserts is to be changed only an extremely simple adjustment is required since the distance between adjacent inserts permanently is maintained the same. The object of the present invention is realized by mounting holders on a screw device such that when the screw is rotated, the holders are displaced axially in such manner that the distance between holders changes equally.

BRIEF DESCRIPTION OF THE DRAWINGS

Below, the principles of the prior art and preferred embodiments of the device according to the invention will be described, reference being made to the accompanying drawings, where FIG. 1 schematically shows the principles of prior art.

DETAILED DESCRIPTION OF PRIOR ART AND PREFERRED EMBODIMENTS OF THE PRESENT INVENTION

Figure 1:
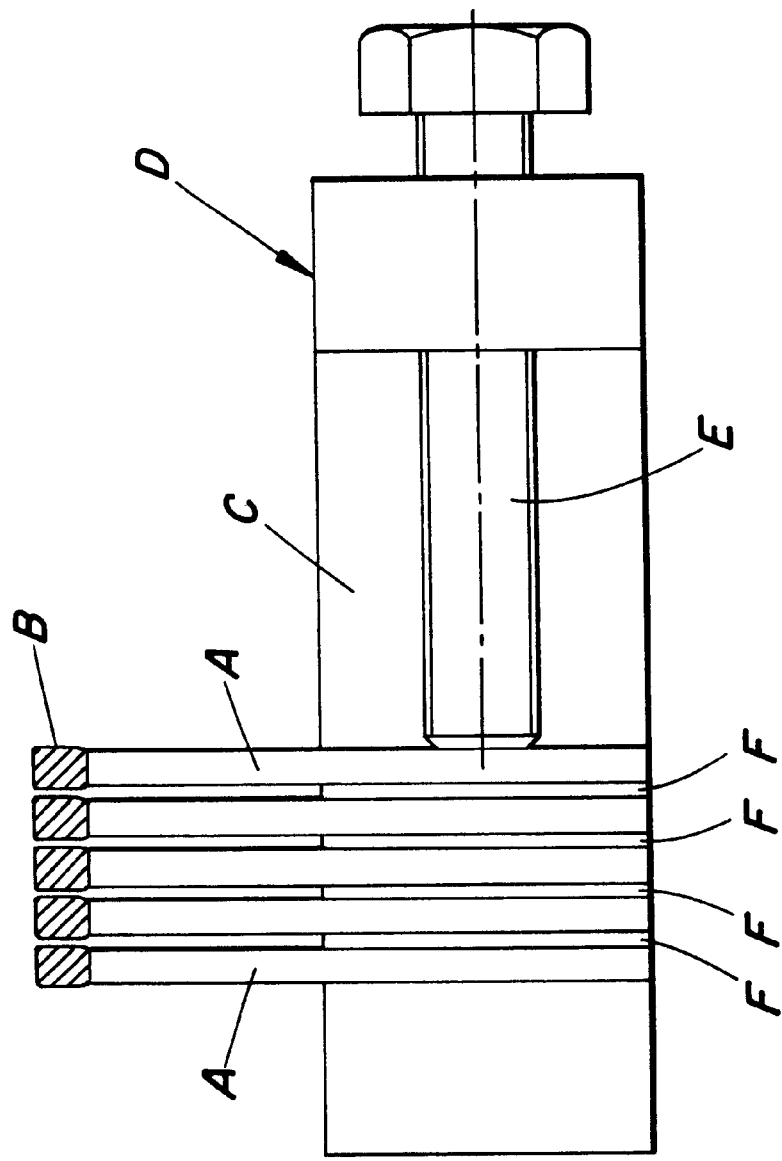

The device according to prior art shown in FIG. 1 includes a number of insert holders A that each receives an insert B for parting or grooving. As is evident from FIG. 1 the insert holders A are clamped in a recess C of a shank D, a screw E urging the set of holders towards one limiting surface of the recess C. Spacers F are provided between adjacent insert holders A, said spacers F having the same extension in the axial direction of the screw E. When the internal, equal distances between adjacent insert holders A is to be changed, the screw E must be loosened and the spacers rearranged by trial and error until the new, equally large, distance between adjacent inserts is created. In such a case, several spacers F may be positioned between two adjacent insert holders A, this further complicating the operation and making it more difficult to achieve equal distances between adjacent inserts.

Figure 2C:
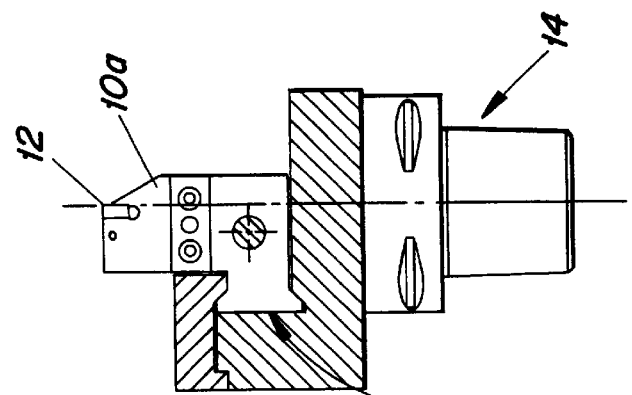
FIG. 2c shows in side view the set of tools according to FIGS. 2a–2b.
Figure 2B:
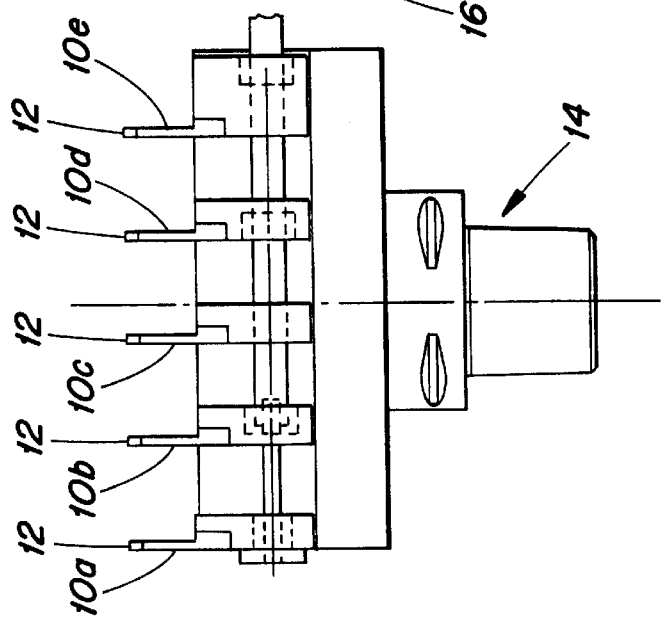
FIGS. 2a–2b show in top view a set of tools equipped with a device according to the present invention in two different setting positions.
Figure 2A:
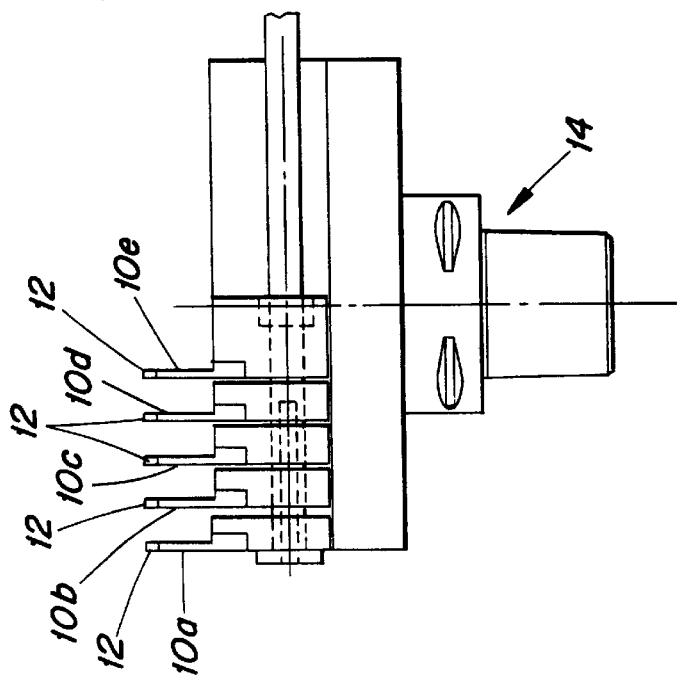

According to the invention, a set of tools shown in FIGS. 2a–2c includes a number of insert holders 10a–10e that are arranged side by side at an internal equidistant relationship between adjacent insert holders. Each insert holder 10a–10e receives an insert, e.g., in the disclosed embodiment, a parting or grooving insert 12. It is at once realized from FIGS. 2a and 2b that the distance between adjacent inserts 12 is larger in FIG. 2b than in FIG. 2a, said parallel displacement of the insert holders 10b–10e having been effected by means of a device according to the invention that will be described more in detail below, reference being made to FIG. 3.

From FIGS. 2a–2c it is also evident that the insert holders 10a–10e are secured in an adapter 14 via a kind of dovetail coupling 16, see FIG. 2c. The dovetail coupling 16 fixes the insert holder 10a in all directions except that it allows the insert holders 10b–10e to be displaced in the plane of the paper in FIGS. 2a and 2b. In every other direction the coupling 16 fixes the insert holders 10b–10e. The displacement of the insert holders 10b–10e in the plane of the paper in FIGS. 2a and 2b is taken care of by the device according to the present invention. However, it should be pointed out that the insert holders 10b–10e are displaceable in the plane of the paper of FIGS. 2a and 2b only when the device according to the invention is activated.

Figure 3:
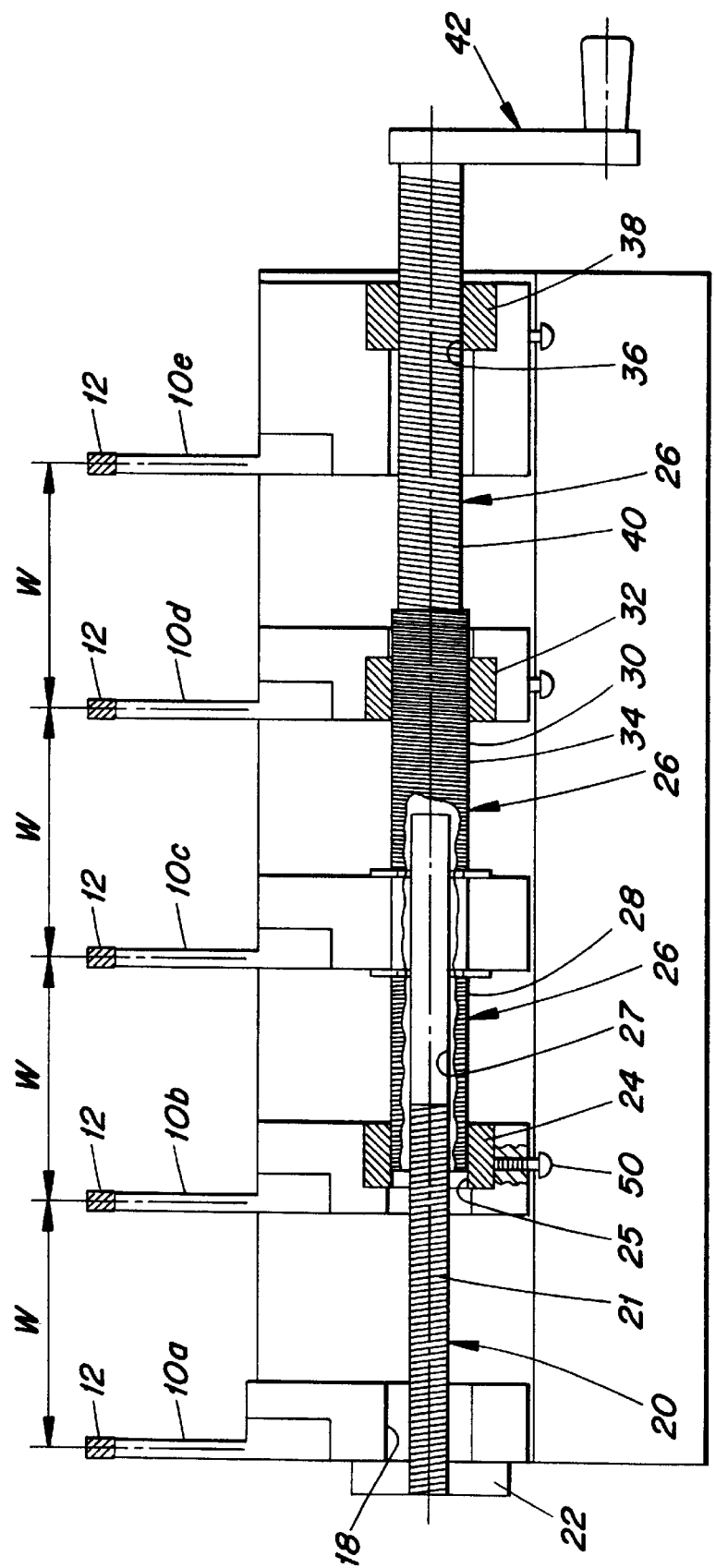
FIG. 3 shows in an enlarged scale a top view of the device according to the invention at the setting position according to FIG. 2b.

The device according to the invention, disclosed more in detail in FIG. 3, includes a system of screw threads. In FIG. 3, center lines of the inserts 12 have been depicted in order to define the distances between adjacent inserts 12 that, according to the invention, may be varied. However those distances should always be equal to each other. The distances in question are designated by W in FIG. 3.

As pointed out above, the first insert holder 10a is completely fixed, i.e. stationary, relative to the adapter 14 via the dovetail coupling 16. The first insert holder 10a has a through-going opening 18. A first, right hand externally threaded screw 20 passes through said opening 18 without cooperating with the first insert holder 10a. The right hand thread 21 of the first screw 20 constitutes a mounting screw thread that has a pitch S. At the left end in FIG. 3 of the dovetail coupling 16 a support 22 is provided, said first screw 20 being non-rotatably fixed in said support 22.

The second insert holder 10b is provided with a first nut 24 having an internal right hand thread 25, said nut 24 being mounted in the second insert holder 10b against axial and rotational movement relative thereto. In the first nut 24, a second or main screw 26 is received which is provided with internal and external right hand threads. The external right hand thread 28 of the second screw 26 cooperates with the internal right hand thread 25 of the first nut 24. The external right hand thread 28 of the second screw 26 and the internal right hand thread 25 of the first nut 24 have a pitch of 0.5 S, this being half of the pitch S of the external right hand thread 21 of the first screw 20.

The internal right hand thread 27 of the second screw 26 cooperates with the external right hand thread 21 of the first screw 20, the internal right hand thread 27 of the second screw 26 thus also having the pitch S. As is evident from the sectioned portion of FIG. 3, the internal right hand thread 27 of the second screw 26 has such an axial extension into the second screw 26 that the first screw 20 may be threaded into the second screw 26 so far that the position according to FIG. 2a is realized.

The third insert holder 10c is attached to the second screw 26 in such a way that the third insert holder 10c is fixed against axial movement relative to the second screw 26, but said third insert holder 10c and said second screw 26 are freely rotatable relative to each other. When the second screw 26 is rotated, the third holder 10c moves axially therewith, but not axially relative thereto.

The fourth insert holder 10d is, via an internal left hand thread 30 of a second nut 32, received upon a first external left hand thread 34 of the second screw 26. The second nut 32 is axially and rotationally fixed relative to said insert holder 10d. The internal left hand thread 30 of the second nut 32 cooperates with the external left hand thread 34 of the second screw 26, both having the pitch 0.5 S. Preferably, the external right hand thread 28 of the second screw 26 and the first external left hand thread 34 have the same external diameter.

The fifth insert holder 10e is, via an internal left hand thread 36 of a third nut 38, received upon a second external left hand thread 40 of the second screw 26, said second external left hand thread 40 having a smaller external diameter than the first external left hand thread 34 of the second screw 26. This is necessary in order to mount the insert holders 10c and 10d. The internal left hand thread 36 of the third nut 38 and the second external left hand thread 40 of the second screw 26 have the pitch S, said threads cooperating with each other.

In FIGS. 2a, 2b and 3 a handle 42 is provided at the right end of the second screw 26, said handle 42 preventing manual rotation of said second screw 26, although a high-precision motor could be used if necessary.

The device described above functions in the following way. For reasons of simplicity it is assumed that the handle 42 is rotated one revolution in the direction that causes all of the insert holders 10b to 10e to be displaced to the left in FIG. 3. When the handle 42 is rotated one revolution in the stipulated direction, the second screw 26 will rotate one revolution. The first insert holder 10a will not at all be affected since the second screw 26 does not cooperate with, i.e., is not threaded to, said insert holder 10a.

Upon rotation of the second screw 26, relative to the first screw 20 that is non-rotatable, a displacement of the second screw 26 to the left in FIG. 3 will occur due to cooperation between the internal right hand thread 27 of the second screw 26 and the external right hand thread 21 of the first screw 20, said displacement being equal to 1.0 S since the right hand threads 21 and 27 have the pitch S and it is assumed that the handle 42 is turned one revolution. Simultaneously the external right hand thread 28 of the second screw 26 will rotate relative to the internal right hand thread 25 of the first nut 24. Thereby, the first nut 24 will be displaced 0.5 S to the right relative to the thread 28 in FIG. 3 since the threads 25 and 28 have the pitch 0.5 S and the second screw 26 has been rotated one revolution. The resulting displacement of the second insert holder 10b relative to the adapter is thus 0.5 S to the left in FIG. 3 since said second insert holder 10b, via the first nut 24, is mounted upon the external right hand thread 28 of the second screw 26.

The third insert holder 10c is displaced equally far to the left as the second screw 26, i.e. the distance 1.0 S, since the third insert holder 10c is not axially displaceable relative to the second screw 26.

The fourth insert holder 10d is, on one hand, displaced the distance 1.0 S to the left in FIG. 3 since the second screw 26 has been displaced the distance 1.0 S to the left and the fourth insert holder is attached to the second screw 26. However, the fourth insert holder 10d is displaced a further distance to the left in FIG. 3 since the first external left hand thread 34 of the second screw 26 cooperates with the internal left hand thread 30 of the second nut 32 to enable the nut 32 to move axially relative to the second screw. Since the threads 30 and 34 have the pitch 0.5 S, a further displacement to the left, a distance 0.5 S, of the fourth insert holder 10d relative to the screw 26 occurs, whereby the resulting displacement to the left in FIG. 3 of the insert holder 10d is 1.5 S.

The fifth insert holder 10e is, on one hand, displaced the distance 1.0 S to the left in FIG. 3 since the fifth insert holder 10e is attached to the second screw 26 that is displaced the distance 1.0 S to the left in FIG. 3. However, the fifth insert holder is displaced a further distance to the left relative to screw 26 in FIG. 3 since the second external left hand thread 40 of the second screw 26 cooperates with the internal left hand thread 36 of the third nut 38. Since these threads have the pitch S, a further displacement a distance 1.0 S to the left of the fifth insert holder 10e relative to the screw 26 will occur when the second screw 26 is rotated one revolution. The resulting displacement to the of the insert holder 10e is thus 2.0 S.

In conclusion, the first insert holder 10a has not been displaced, the second insert holder 10b has been displaced the distance 0.5 S (i.e., distance "x") to the left in FIG. 3, the third insert holder 10c has been displaced the distance 1.0 S (i.e., distance "2x") to the left in FIG. 3, the fourth insert holder 10d has been displaced the distance 1.5 S (i.e., distance "3x") to the left in FIG. 3 and the fifth insert holder 10e has been displaced the distance 2.0 S (i.e., distance "4x") to the left in FIG. 3. It is thus realized that by rotation of the second screw 26, via the handle 42, the distance between adjacent insert holders has decreased the distance 0.5 S (i.e., distance "x") in a simultaneous parallel displacement.

The provision of nuts 24, 32, 38 to form the internal threads 25, 34, 36 of the insert holders 10b, 10d, 10e, instead of forming the internal threads directly in the holders themselves is advantageous, because the nuts could, if desired, be made selectively rotatable relative to the respective holders in order to effect a calibration of the relative positions of the insert holders upon the second screw 26. A releasable lock, such as a set screw 50, could be provided which when loosened, permits the nut to be rotated relative to the holder. Preferably the nuts 24, 32, 38 could be provided with a key means or the like in order to make it possible to easily rotate the nuts 24, 32, 38.

Feasible Modifications of the Invention

Figure 4:
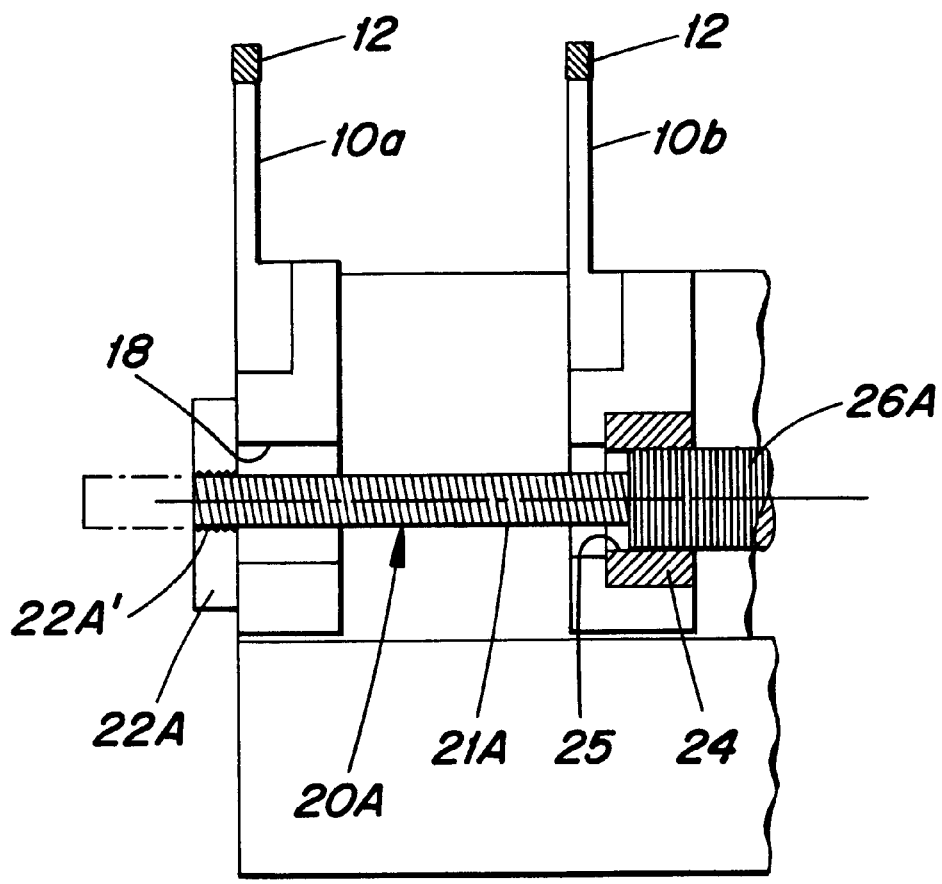
FIG. 4 shows a fragmentary view of an alternate embodiment.

Within the scope of the invention it is feasible to modify the embodiment according to FIGS. 2a–2c and 3 in such a way that the internal thread 27 of the second screw 26 is deleted, i.e. a first screw 20A is permanently fixed to the second screw 26A, as shown in FIG. 4. In such an embodiment, the first screw 20A and the second screw 26A may be in one integral piece. In such a case the support 22A has an internal mounting thread 22A' that cooperates with the external thread 21A of the first screw 20A, said thread coupling having a pitch S. When the distance between adjacent insert holders 10a–10e has been decreased, the free end of the first screw 20A will project to the left in FIG. 4 beyond the support 22A, as shown in broken lines.

What is claimed is:

1. A metal-cutting apparatus comprising an externally threaded screw and a set of non-rotatable insert holders spaced by equidistant apart along an axis of the screw, there being at least first, second, third and fourth holders arranged axially in succession, the first holder being axially fixed, the second, third and fourth holders being axially movable relative to the first holder, the screw being rotatable relative to the second, third and fourth holders and connected thereto such that in response to each revolution of the screw, the second holder is moved in a first axial direction by a distance x, the third holder is moved in the first axial direction by a distance 2x, and the fourth holder is moved in the first axial direction by a distance 3x, whereby the equidistant spacing between the holders is changed by the distance x.

2. A metal-cutting apparatus comprising:
   a mounting screw thread which defines an axis and has a pitch S;
   a set of at least first, second, third and fourth non-rotatable insert holders spaced equidistantly apart along the axis;
   a main screw threadedly mounted on the mounting screw thread;
   the second holder having an internal screw thread threadedly mounted on a first external screw thread of the main screw which is threaded in a first direction and has a pitch 0.5 S;
   the third holder being fixed against axial movement relative to the main screw; and
   the fourth holder having an internal screw thread threadedly mounted on a second external thread of the main screw that has a pitch 0.5 S, the second external thread being threaded in a second direction opposite the first direction.

3. The apparatus according to claim 2 further including a fifth insert holder having an internal screw thread threadedly mounted on a third external thread of the main screw, the third external thread having a pitch S and being threaded in the second direction, the third external thread having a smaller diameter than the second external thread.

4. The apparatus according to claim 2 wherein the internal screw thread of each of the second and fourth holders is formed on a nut mounted therein, the nuts being rotatable relative to their respective holders about the axis, and locking means for selectively locking the nuts against rotation relative to their respective holders.

5. The apparatus according to claim 2 wherein the mounting screw thread comprises an external screw thread of a fixed mounting screw that is threadedly connected to an internal screw thread of the main screw.

6. The apparatus according to claim 2 wherein the main screw has an external screw thread, the mounting screw thread comprising an internal screw thread of a fixed support that is threadedly connected to the external screw thread of the main screw.

7. The apparatus according to claim 2 wherein the first holder is fixed against axial movement.

8. The apparatus according to claim 2 wherein the main screw has a handle attached at one end thereof to permit the main screw to be manually rotated.

* * * * *